United States Patent [19]

Peterson et al.

[11] 3,975,173

[45] Aug. 17, 1976

[54] METHOD FOR CLEANING GAS FILTER BAGS

[75] Inventors: Harley G. Peterson, La Crescenta; Donald E. Crough, Placentia, both of Calif.

[73] Assignee: Joy Manufacturing Company, Pittsburgh, Pa.

[22] Filed: July 2, 1975

[21] Appl. No.: 592,419

Related U.S. Application Data

[63] Continuation of Ser. No. 478,898, June 13, 1974, abandoned.

[52] U.S. Cl..................................... 55/96; 55/303; 55/341 NT

[51] Int. Cl.² ........................................ B01D 46/04
[58] Field of Search ............... 55/96, 302, 303, 341

[56] References Cited
UNITED STATES PATENTS

| | | | |
|---|---|---|---|
| 3,057,137 | 10/1962 | Perlis et al. | 55/303 |
| 3,390,512 | 7/1968 | Hanes | 55/96 |

*Primary Examiner*—Bernard Nozick

[57] ABSTRACT

An improved method of cleaning gas filter bags and more particularly an improved method of opening the exhaust passage of a baghouse upon the completion of the cleaning of the filter bags therein.

2 Claims, 3 Drawing Figures

METHOD FOR CLEANING GAS FILTER BAGS

This is a continuation of application Ser. No. 478,898, filed June 13, 1974, now abandoned.

Various types of known gas filtering apparatus often have included valve means such as flap or swing valve mechanisms to control gas flow therewithin as prescribed for normal system operation, for example to selectively control the opening and closing of a clean gas outlet port or a collapsing air inlet port in a baghouse filtering apparatus. Although such valve means generally have served the purposes intended, they have nonetheless been subject to certain undesirable shortcomings. For example, the relatively large flow channel areas typically required in high capacity gas filtering apparatus and the need for economical construction of such apparatus have necessitated the use of relatively imprecise valve means to open and close such flow channels. Consequently, precise incremental flow control by incremental adjustment of known valve means has heretofore been difficult or impossible. Such flow control difficulties and the problems precipitated thereby are exemplified by a conventional baghouse filtering system wherein the initial opening of the clean gas outlet port by conventional valve means at the conclusion of a bag collapsing and cleaning cycle may subject the collapsed filter bags to a very rapid and harsh reinflation thereby excessively stressing the bags and precipitating premature failure thereof. Additionally, in an apparatus of the type specified known valve means may require an excessively large and powerful valve actuator solely to overcome the relatively large differential pressure typically encountered only during initial stages of valve opening.

By virtue of the present invention there is provided a gas flow control valve means and method which alleviates the problems cited hereinabove and which additionally provides for smoother, more reliable and more readily controllable overall filter system operation.

These and other objects and advantages of the present invention are more fully specified in the following description and illustrations, in which.

Figure 1:
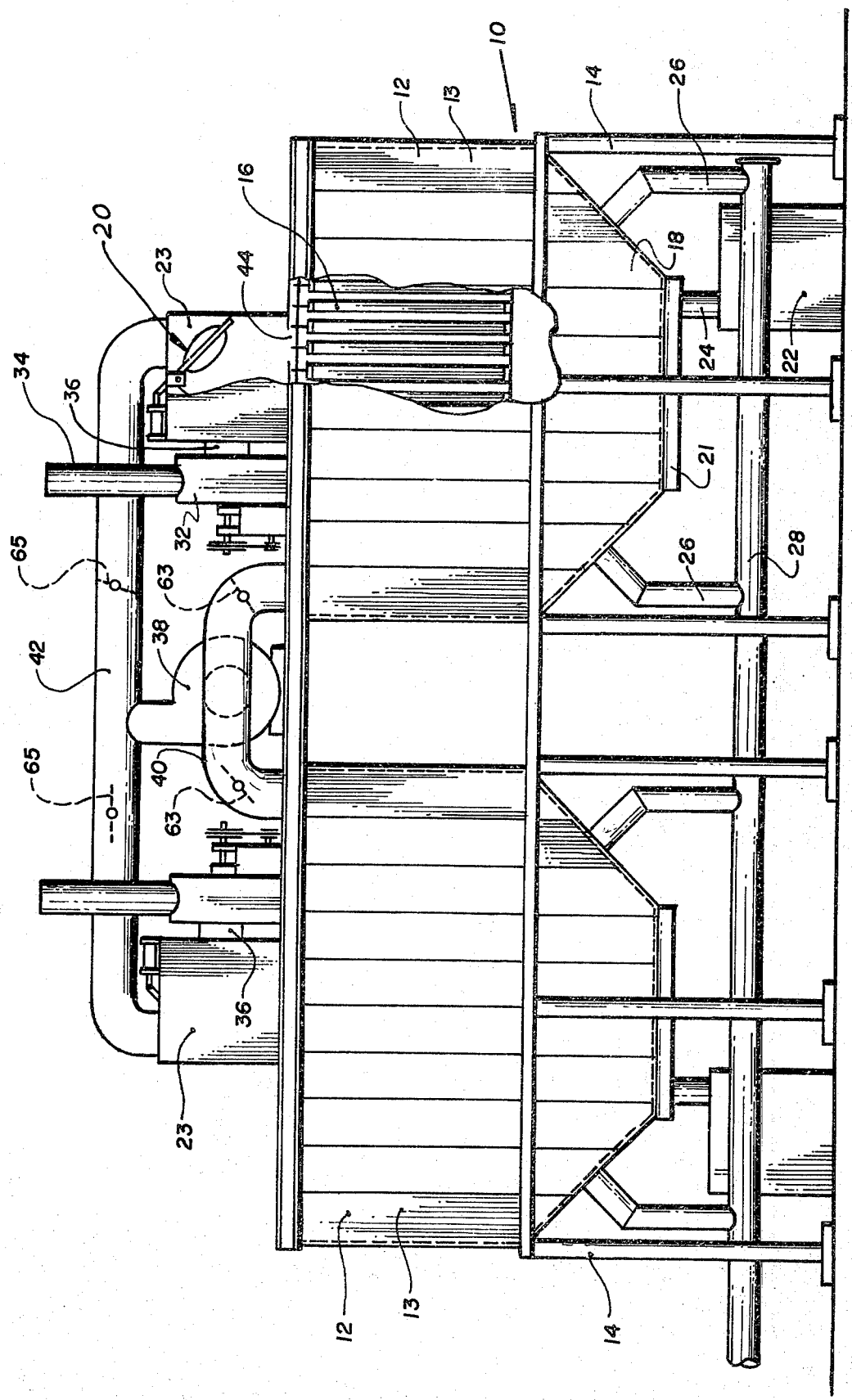
FIG. 1 illustrates partly in section a baghouse gas filtering apparatus including valve means constructed in accordance with the principles of the preesent invention.

There is generally indicated at 10 in FIG. 1 a baghouse gas filtering apparatus including a gas flow control valve means 23 constructed in accordance with the principles of the present invention. Those versed in the art will recognize that the apparatus 10 is merely illustrative of one application of the present invention. Valve 23 may in fact be adapted for use in other known gas filtering apparatus and additionally in various other fluid flow control aplications which such as in ventilating equipment.

As shown, the apparatus 10 includes two baghouse filtering units 12 both suitably supported by a rigid structural frame 14 and each including a box-like enclosure 13 which carries therewithin a plurality of well known tubular filter bags 16 disposed in any suitable arrangement such as a plurality of rows and columns of vertically oriented bags 16. Each unit 12 together with yet to be described adjunctive components comprises in effect an independent filtering system. It is to be understood that inasmuch as such filtering systems as the apparatus 10 may commonly comprise a large plurality of substantially identical units 12 operating in parallel, the description hereinbelow refers to only one of the units 12.

The enclosure 13 includes a lower portion thereof formed as a hopper 18 which openly communicates with the inner confines of bags 16 in the customary fashion for receiving accumulated dust therefrom during bag cleaning. Hopper 18 has conveying means 21 adapted to convey such dust therefrom to a disposal bin 22 via a passage 24. The open communication between hopper 18 and the inner confines of bags 16 also provides a flow path into the bags 16 for dust laden gaseous effluent delivered to hopper 18 via a duct 28 and inlets 26 as shown.

The unit 12 further includes: one of valves 23 disposed atop the enclosure 13 and communicating with the inner confines therof via a port 44; a suitably driven exhaust fan 32 disposed atop the enclosure 13 and having the inlet thereof communicating with valve 23 via a duct 36 and the outlet thereof communicating with the atmosphere via a stub stack 34; and a suitably driven collapsing air fan 38 shown as having the inlet thereof communicating with the inner confines of enclosure 13 via a duct 40 and having the outlet thereof communicating with valve 23 via a duct 42. As shown the ducts 40 and 42 include suitable valve means 63 and 65, respectively, for controlling communication therethrough.

In the operation of apparatus 10 a stream of particulate laden gaseous effluent admitted into hopper 18 of enclosure 13 via the duct 28 and the respective inlets 26 is impelled by a negative pressue differential provided by fan 32 upwardly into the inner confines of bags 16 and through the fabric of the bags 16 to filter dust or other particulates from the effluent stream. The cleansed gas stream is thence impelled further upwardly within enclosure 13 and to the atmosphere via port 44, valve 23, duct 36, fan 32 and stack 34. The substantially continuous filtering operation is periodically interrupted by a filter bag cleaning cycle during which the valves 23, 63 and 65 are actuated to direct a flow of collapsing fluid such as cleansed gas from an alternate filtering unit 12 via one leg of duct 40, fan 38, one leg of duct 42, valve 23 and port 44 into enclosure 13 to collapse bags 16 and thereby dislodge the accumulated dust cake therewithin in the conventional and well known manner. Thereupon the dislodged dust cake falls perforce into hopper 18 and is thence conveyed by means 21 via passage 24 into bin 22 for ultimate disposal thereof.

Inasmuch as the structure and operation of the apparatus 10 as described heretofore are well known in the art, and inasmuch as further detailed description thereof is not necessary for an understanding of the present invention, such additional description is omitted herefrom. Applicant hereby refers to U.S. Pat. No. 3,057,137 for further description of such a baghouse filtering apparatus.

Figures 2, 3:
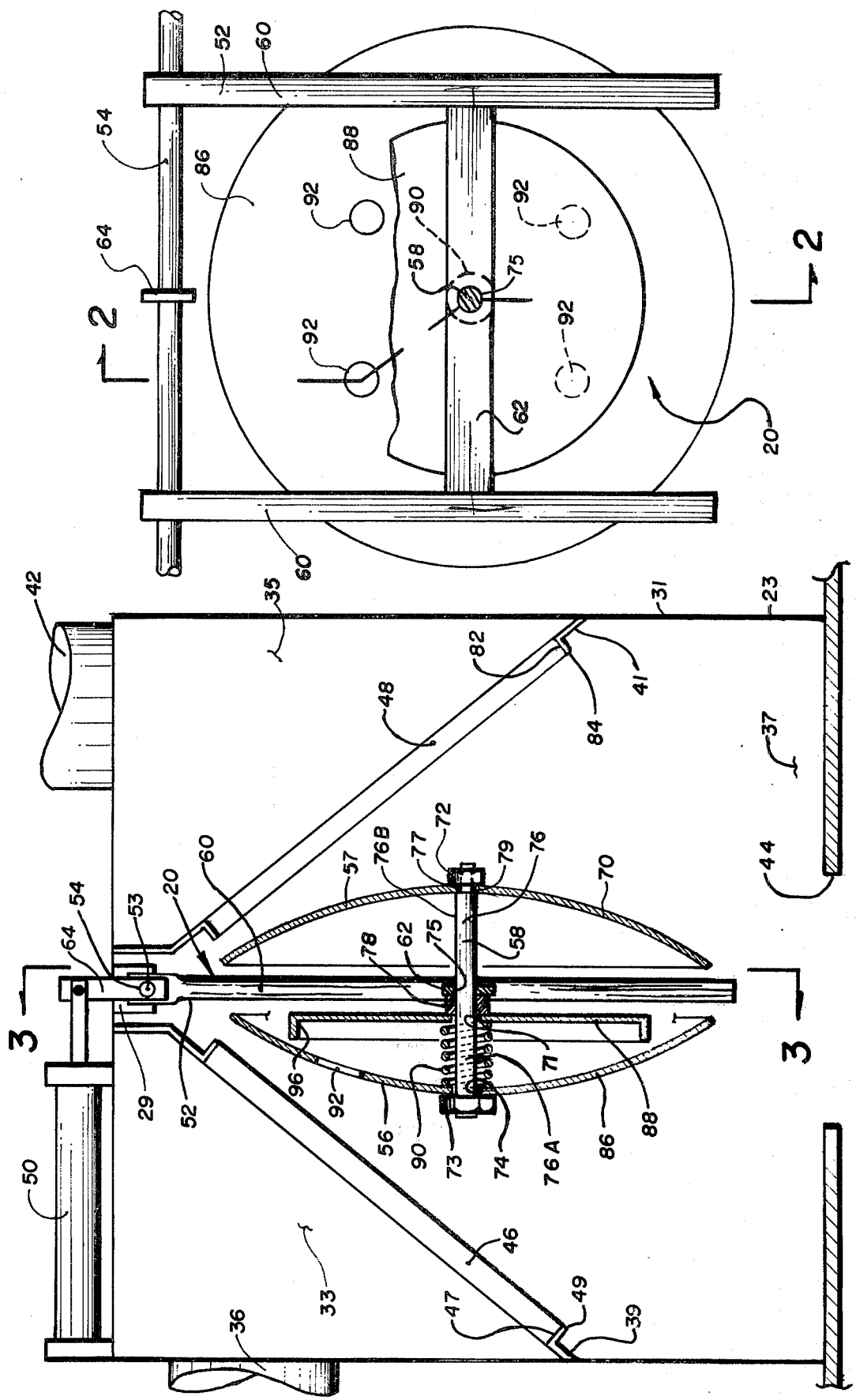
FIG. 2 illustrates in section the valve means of this invention substantially as seen from line 2—2 of FIG. 3.
FIG. 3 is a section of the valve of FIG. 2 as seen from line 3—3 of FIG. 2.

By reference to FIGS. 2 and 3 it will be seen that valve 23 of this invention comprises a rigid, generally rectangular or box-like housing 31 having therewithin: a gas outlet space 33 which communicates with fan 32 via duct 36; a collapsing air inlet space 35 which communicates with fan 38 via duct 42; and a valve operating space 37 located generally intermediate the spaces 33 and 35 and separated therefrom by intervening interior wall portions 39 and 41, respectively. The space 37 communicates with spaces 33-35 soley by means of respective ports 46-48 formed in respective wall portions 39-41, and additionally communicates with the respective enclosure 13 via the port 44.

The wall portions 39 and 41 are rigidly affixed within housing 31 in a generally downwardly and outwardly diverging configuration as viewed in FIG. 2 to form a downwardly opening angle having its apex within housing 31 adjacent a horizontal pivot axis indicated at 53. An elongated shaft 54 disposed coincidentally with axis 53 is pivotally secured thereat as by shaft bearing portions 29 of housing 31 such that a swing or flap valve assembly 20 rigidly retained by the shaft 54 is movable through an arcuate path within space 37 laterally intermediate extreme positions thereof adjacent wall portions 39 and 41 to selectively close or open the respective ports 46 and 48 in a manner to be described hereinbelow. In FIG. 2 the assembly 20 is shown intermediate the extreme positions thereof.

The assembly 20 comprises: a rigid frame 52 secured to the shaft 54; a pair of axially aligned convex or dome-like circular valve portions 56 and 57 carried adjacent opposite sides of the frame 52 and adapted to be sealingly engageable with respective ports 46 and 48; and an elongated retaining assembly 58 which is rigidly secured to frame 52 and extends coaxially intermediate portions 56 and 57 to captively retain the portions 56 and 57 in the respective operating positions thereof.

As best shown in FIG. 3 the frame 52 includes a pair of elongated members 60 disposed in parallel, laterally spaced relation and rigidly secured together by an elongated cross member 62 extending laterally therebetween intermediate the longitudinal ends thereof and rigidly affixed thereto as by weldments (not shown). The frame 52 is rigidly secured to shaft 54 adjacent one longitudinal end of members 60 as by set screws (not shown) or other suitable arrangement. The member 62 includes intermediate the longitudinal ends thereof a transversely extending through bore 75 to receive the assembly 58.

As shown the assembly 58 comprises a rigid elongated member 76 which is suitably rigidly secured as by weldments (not shown) intermediate the axial ends thereof within the bore 75 such that respective end portions 76a and 76b thereof extend in opposing directions outwardly of the plane of frame 52 to retain respective portions 56 and 57.

The portion 57 includes a circular and generally outwardly convex or dome-like valve plate 70 having an axial bore 77 which receives end portion 76b whereby the portion 57 is captively retained by assembly 58 intermediate an annular shoulder portion 79 of end 76b and a fastener 72 threadingly engaging end 76b outwardly adjacent shoulder 79.

The valve portion 56 includes: a circular and generally outwardly convex or dome-like perforated main valve plate 86; a generally disc-like secondary valve plate 88 disposed coaxially inwardly from or on the concave side of plate 86 and axially movable with respect thereto; and a helical spring member 90 extending coaxially intermediate the plates 86 and 88 so as to provide a parting or disjunctive biasing force therebetween. The plate 86 includes an axial bore 74 adapted to receive end portion 76a, and a plurality of circumferentially spaced ports 92 which communicate openly intermediate axially opposed sides of plate 86. The plate 88 includes an axial bore 71 to receive the end portion 76a and an annular flange portion 96 which is suitably formed so as to be sealingly engageable with a mating peripheral portion of the inner or concave side of plate 86 radially outwardly adjacent the ports 92 to close the ports 92 in a manner to be described hereinbelow. In assembly the end 76a is received within bores 71 and 74 of respective plates 88 and 86, and additionally coaxially within the spring 90 extending coaxially therebetween such that the portion 56 is captively retained by assembly 58 intermediate a fastener 73 which threadingly engages an outermost extremity of end portion 76a, and a cylindrical spacer 78 which encompasses end 76a adjacent member 62.

Ideally there is provided suitable spacing intermediate frame 52 and respective portions 56 and 57, and additionally a suitable degree of looseness in the retention of portions 56 and 57 by the assembly 58 such as by radial clearance intermediate bores 71, 74, and 77 and the member 76, that the plates 70, 86 and 88 are rendered adjustable within limits to enhance sealing capability of the portions 56 and 57 with respective ports 46 and 48 by providing for automatic correction of minor misalignment therebetween.

In practice the valve 23 as described is operable by any suitable means such as an elongated link 64 rigidly affixed adjacent one longitudinal end thereof to the shaft 54 and pivoted adjacent the opposing longitudinal end thereof to one end of a well known fluid operable cylinder assembly 50 carried externally of the housing 31. Actuation of the assembly 50 powers valve assembly 20 through an arcuate path within space 37 intermediate extreme positions thereof to provide sealing closure or opening of respective ports 46 and 48. To enhance such closing and opening opeerations the ports 46 and 48 include respective cylindrical flange portions 47 and 82 having respective annular seating surfaces 49 and 84 which are adapted to be sealingly engageable by the respective portions 56 and 57 as follows.

During normal filtering operations the assembly 20 is positioned to maintain closure of port 48 by sealing engagement of a peripheral portion of the domed or convex side of plate 70 with annulus 84 as shown in FIG. 1 whereby collapsing air flow from fan 38 to unit 12 is interrupted and the clean gas flow path to the atmosphere via port 46 is fully open. Periodically as bags 16 accumulate therewithin a dust cake, a filter bag cleaning cycle is initiated during which the assembly 50 is operated to move assembly 20 to the opposite extreme position thereof (not shown) thereby opening the port 48 to a flow therethrough of collapsing air and closing the port 46. The closing of port 46 initially comprises the seating of plate 86 adjacent annulus 49 in substantially the manner described hereinabove for the closure of port 48. The annulus 49 engages plate 86 radially outwardly adjacent ports 92 whereby the available flow area intermediate spaces 37 and 33 is limited to the aggregate area of the ports 92 which is substantially less than the flow area of the port 46. Subsequent continued operation of assembly 50 urges the plate 88 toward the seated plate 86 against the bias of spring 90 until flange 96 contacts the inner or concave surface of plate 86 radially outwardly adjacent ports 92 thereby sealing the ports 92 from space 37 and thus interrupting clean gas flow to the atmosphere. It is of course to be understood that by prudent selection of the spring rate for spring 90 or by adjustment of nut 73 the force required to close ports 92 may be adjusted within a wide range of values.

Upon termination of the bag cleaning cycle the assembly 50 is operated to open port 46 and close port 48 by cycling assembly 20 to the position illustrated in FIG. 1. The consequent opening of port 46 includes a first stage of valve opening during which the biasing force of spring 90 disengages flange 96 from plate 86 and maintains the plate 86 in sealing engagement with annulus 49 thereby reestablishing the flow of clean gas from unit 12 to the atmosphere at a relatively low flow rate through ports 92 to reinflate the collapsed filter bags gently and without undue streess therupon. Spring 90 urges plates 86 and 88 axially apart to the maximum possible extent as determined by the axial distance intermediate nut 73 and spacer 78 whereupon a second stage of valve opening commences during which plate 86 disengages annulus 49 to provide an incremental increases in clean gas flow to the atmosphere. Further actuation of assembly 20 of course quickly restores full flow through port 46 and ultimately brings plate 70 into sealing engagement with annulus 84 once again to close the port 48 and thereby complete a cycle of operation of the valve 23.

By virtue of the structure described hereinabove there is provided a valve means which is operable to seal a collapsing air inlet port and a clean gas outlet port and which is further operable to permit gradual opening of the clean gas outlet port by degrees to produce incremental increases in clean gas flow therethrough to reinflate the collapsed filter bags gradually and gently.

Notwithstandiing the reference hereinabove to a specific structure of the valve disclosed it is to be understood that the invention herein may be constructed in accordance with various other embodiments and with numerous modifications thereto without departing from the broad spirit and scope thereof. For example: the valve means disclosed herein may be used in conjunction with a wide variety of gas cleansing equipment or in other applications related to control of gas flow, and may be mounted in numerous configurations, for example to swing in a vertical or horizontal arc or to move linearly under the impetus of an axial push rod acutator; it is contemplated that the flow area of ports 92 may be varied as by means of adjustable slide valves carried by plate 86 or the like to add a further dimension of flow control to the valve disclosed herein; it is additionally contemplated that the structure of valve portion 56 could include a plurality of nested plates having successively smaller flow ports and being separated by successively stronger spring member to provide a capability for increasing or decreasing flow therethrough in a plurality of incremental steps during valve actuation; and the like. These and other embodiments having been envisioned and anticipated it is requested that this invention be interpreted broadly and limited only by the scope of the claims appended hereto.

What is claimed is:

1. In a method of exhausting gas from a bag filter compartment into an exhaust passage of a filter unit, wherein a solids laden gas is passed from a primary source through filter bags located in the bag filter compartment and the resultant filtered gas is exhausted through the exhaust passage which is controllable by valve means, and wherein the valve means is periodically moved to close the exhaust passage and a cleaning gas is passed from a secondary source through said bags countercurrent to the flow of the solids laden gas and at an elevated pressure with respect to said solids laden gas, after which the valve means is moved to open the exhaust passage and the flow of cleaning gas is terminated, the improvement comprising the steps of: moving a first portion of said valve means from said exhaust passage to fully open only a restricted passageway between said compartment and said exhaust passage to allow a first predetermined relatively restricted flow of gas through said restricted passageway from said compartment to said exhaust passage and thereafter moving a second portion of said valve means from said exhaust passage to fully open said exhaust passage to allow a relatively unrestricted second predetermined flow of gas from said compartment to said exhaust passage.

2. The improved method as specified in claim 1 including the additional step of: subsequent to moving said second portion of said valve means to fully open said exhaust passage, moving said valve means to a position to block flow of said cleaning gas from said secondary source to said compartment.

* * * * *

UNITED STATES PATENT OFFICE
CERTIFICATE OF CORRECTION

PATENT NO. : 3,975,173
DATED : August 17, 1976
INVENTOR(S) : Harley G. Peterson et al.

It is certified that error appears in the above-identified patent and that said Letters Patent are hereby corrected as shown below:

Column 1, line 60 delete "which"

Column 2, line 36, delete "pressue" and insert -- pressure --.

Column 3, line 4, delete "soley" and insert "solely--.

Column 4, line 37, delete "opeerations" and insert --operations--.

Column 5, line 15, delete "streess" and insert --stress--.

Signed and Sealed this

Seventh Day of December 1976

[SEAL]

Attest:

RUTH C. MASON
Attesting Officer

C. MARSHALL DANN
Commissioner of Patents and Trademarks